2,998,410
PROCESS FOR THE MANUFACTURE OF METHYLOL MELAMINES AND ALKYLATED METHYLOL MELAMINES
Albert W. Jefts, Glenville, and William James Quinlan, Stamford, Conn., assignors to American Cyanamid Company, New York, N.Y., a corporation of Maine
No Drawing. Filed July 9, 1956, Ser. No. 596,452
11 Claims. (Cl. 260—67.6)

The present invention relates to a process for preparing certain methylol melamines, certain alkylated methylol melamines, the products of said process, and their use in surface coatings and the like.

Heretofore, in order to obtain methylol melamines, suitable ratios of melamine and formaldehyde were combined in an aqueous medium, heated, and the resultant syrup of methylol melamine was thereafter dried over long periods of time to obtain a solid product. Such processes were expensive because of the periods of time involved to dry or dehydrate the methylol melamine and the additional equipment which was required to do the same.

It is an object of the present invention to provide a process for producing methylol melamine whereby the said material is readily obtained and in an easily handled solid state, as distinguished from a liquid or syrupy state and in controlled periods of time.

Another object of the present invention is to provide a process for making alkylated methylol melamine in which the methylol melamine is in a solid state and may be readily dehydrated prior to alkylation.

Another object of the present invention is to provide a process for making alkylated methylol melamine in which the mole ratios of alcohol to methylol melamine are lower than those heretofore employed in the prior art.

A further object is to provide alkylated methylol melamine condensation products which are compatible with a wide variety of alkyd resins which impart improved properties such as gloss, hardness, mar resistance and chemical resistance to alkyd resin surface coating compositions.

It is still a further object to provide alkylated methylol melamine condensation products which may be used in admixture with commercially available amino resins in alkyd resin surface coating compositions to impart improved properties of hardness, gloss, mar resistance and the like thereto.

These and other objects and advantages will become apparent as the present invention is set forth more fully hereinbelow.

According to the present invention, a process is provided for preparing methylol melamine as a precipitated product which comprises heating with continuous mixing melamine and formaldehyde in a mole ratio of from 1:6.5 to 1:20, respectively, in the presence of about 45 to 75% by weight of water based on the total weight of the reaction mixture while maintaining a pH of between 7.0 and 8.5 and a temperature between 45 and 75° C. until the reaction mixture has cleared or has become transparent. Thereafter, according to the present invention, the temperature of the reaction mixture is maintained between 45 and 75° C. while stirring the reaction mixture without agitation until a major portion of the precipitated product is formed, after which the reaction mixture is cooled to a temperature of between 15 and 30° C. until substantially all of the product has precipitated.

Below a mole ratio of 1:6.5, melamine to formaldehyde, the desired melamine-formaldehyde reaction product is not achieved, while above a mole ratio of 1:20, melamine to formaldehyde, the excess formaldehyde does not improve the reaction product and increases handling difficulties thereof. A mole ratio range of from 1:6.5 to 1:10, melamine to formaldehyde, respectively, is preferred.

The amount of water in the reaction medium is between 45 and 75% based on the total weight of the reaction mixture and is preferably from between 55 and 65% of the total reaction mixture weight. When the amount of water is below 45%, the methylol melamine reaction product comes out of solution so rapidly as to endanger the opportunity to achieve the desired degree of methylolation. In addition, because of caking, the difficulty of handling the material is greatly increased. When the water concentration exceeds 75% by weight of the total reaction mixture, second crop or post precipitations occur in the filtrate. In addition, the precipitated product is extremely fine or slush-like and, as a result, is more difficult to handle.

The amount of water present in the reaction medium or the reaction system is based on the total weight of the reaction mixture, as noted above. This term is intended to include melamine, formaldehyde, water and the basic catalyst. Generally speaking, the catalyst is one which will maintain a pH of between about 7.0 and about 8.5 under the reaction conditions, and with the reactants, of the present invention. This includes alkaline materials, such as sodium hydroxide, potassium hydroxide and the like, but preferably the basic catalyst is sodium bicarbonate, which apparently tends to form a buffer in the pH range of about 7.0 to 8.5. Regardless of what the catalyst is, when employed as an aqueous solution, the solution is considered to be composed entirely of water for purposes of the present invention in that the amount of catalyst present therein, weightwise, is considered to be relatively insignificant.

Formaldehyde as formalin generally contains on the order of 37% formaldehyde, less than 2% methanol and the remainder, water. The water present is significant, and obviously is used to adjust the water content of the reaction mixture. While formaldehyde as formalin is preferred because of economics, paraformaldehyde and other formaldehyde engendering compounds may be used in lieu thereof. In the case of commercially available paraformaldehyde, which is 95% paraformaldehyde and 5% water, with minor traces of methanol, this 5% is considered as being composed entirely of water in adjusting the water content of the reaction mixture according to the present invention.

It has been determined that in order that the process of the present invention may be commercially acceptable that the pH of the reaction medium herein must necessarily be between 7.0 and 8.5. pH values below 7.0 will not produce the desired resulting product and pH's in excess of 8.5 cause the resultant product to precipitate down so rapidly as to be difficult to handle, both from the point of view of the time in which the precipitated product is formed and in the physical characteristic of the precipitated product. In the latter instance, the product is extremely fine and slush-like, and cannot be handled readily by conventional plant equipment. By maintaining the pH between the values of 7.0 and 8.5, these difficulties are overcome. Preferably, the pH range employed is from between 7.3 and 8.3. In instances where the pH tends to use above the upper limit during reaction, it may be readily controlled by the addition of acid. In this connection, formic acid is preferred though other organic or inorganic acids may be employed for the purpose.

While temperatures below 45° C. result in the formation of a product, the reaction proceeds very slowly and the product is of an inferior quality, containing various lower methylol condensates which, for the most part, are considered here to be undesirable. This is true in that at temperatures below 45° C. sufficient heat is not provided to supply the energy required to fully complete the reaction. While temperatures above 75° C. do result in the formation of a product, it will usually contain polymeric materials and is thus less desirable also. This is particularly true if temperatures of this order are maintained for significant periods of time after the reaction mixture has cleared. A reaction temperature of from between 55 and 65° C. is preferred.

An important aspect of the present invention is the concept of maintaining the reaction temperature after the reaction mixture has cleared and the product begins to precipitate. This is necessary to insure that the desired resultant reaction product is produced. Highly methylolated melamine is less water-soluble than melamine having lower degrees of methylolation. When a clear solution of melamine in an excess of formaldehyde is obtained, the solutes consist mainly of lower order methylol melamines. Maintaining the reaction temperature after complete solution causes continuation of the condensation reaction until a more fully methylolated product is obtained. The lower degree of solubility of the desired product allows it to crystallize at the reaction temperature, thus allowing the product to crystallize at the reaction temperature insures substantially complete methylolation, as opposed to crystallization by cooling or evaporation of solvents.

The continuous mixing and reaction temperature are maintained until the reaction mixture clears. After the reaction mixture clears, the reaction temperature is further maintained until more than 50% of the methylol melamine condensate has precipitated out of solution. Preferably, the temperature is maintained until from between 60 and 90% and even more of the yield of said condensate is present in the reaction mixture as precipitate. The proper percentage of precipitate in the reaction vessel may be easily correlated to time and specific reaction conditions, empirically. As a result of such correlation, it has been determined that time periods of from 15 to 60 minutes are sufficient for the necessary amount of precipitate to form and preferably the time period is from about 20 minutes to about 50 minutes. When the proper percentage of precipitate is formed, the temperature of the reaction mixture is allowed to cool to between 15 and 30° C. at which temperature the reaction mixture is maintained until substantially all of the condensate has precipitated. This may generally and is preferably done by allowing the reaction mixture to cool at the rate of about 15° C. an hour.

Preferably, after the reaction mixture clears, and before a precipitate begins to form, the speed of the mixing means is reduced if necessary so as to be mixing without significant agitation, i.e. not producing any surface disturbances. Reducing the speed of the mixing means so that the mixing is achieved without significant agitation enables the crystals of the precipitated methylol melamine to grow and thus be more easily filtered or centrifuged by conventional plant equipment.

As used herein, the term "mixing" is intended to include the functions of mixing and/or stirring means, which are or are not accompanied by agitation. The term "agitation" in turn is intended to include the concept of mixing so as to produce a turbulent or violent movement in the reaction mixture. Mixing or stirring with agitation using an anchor type of stirrer as an exemplary mixing means would involve the stirrer moving through the reaction mixture so as to produce violent movement therein. Mixing or stirring without agitation, employing a similar stirring means, would include the stirrer moving through the reaction mixture so as not to produce any violent movement therein, or to be simply passing through said mixture.

If the initial reactants are mixed with agitation, it is greatly preferred that when the reaction mixture clears, the speed of the mixing means is reduced so as to be mixing without agitation in order that the particles of methylol melamine be allowed to grow to sizes which are more readily handled by conventional solid separating means. If when the reaction mixture clears, the said mixing means continues to mix with agitation, the product tends to precipitate from the solution more rapidly and in a much more finely divided state, which renders it more difficult to handle. Mixing without agitation may be employed throughout the present process. In such an instance, the process is more time-consuming without resulting in an improved product.

If the preferred procedure is employed, it is not absolutely essential to the present invention that the mixing means be adjusted so as to be mixing without agitation precisely at the moment the reaction mixture clears. While best results are achieved when the mixing means are adjusted very shortly after the clearing of the reaction mixture, such adjustments have been made with an acceptable product produced, even after the precipitated product begins to form.

The formaldehyde and water in suitable amounts for providing the proper mole concentration for formaldehyde and proper water content for the reaction mixture may be heated to the reaction temperature of between 45 and 75° C. prior to the introduction of melamine and basic catalyst. Heating the formaldehyde and water up to the temperature of reaction before the introduction of melamine and basic catalyst facilitates control of the rate of reaction.

In addition, all of the components necessary to the reaction may be heated to the temperature of reaction simultaneously. Furthermore, the formaldehyde, water and basic catalyst may be heated to the reaction temperature prior to the introduction of the melamine. Regardless of which of the above procedures is employed in initiating the reaction, the essential thing is that the pH of the reaction mixture be maintained between 7.0 and 8.5 and the reaction temperature should be between 45 and 75° C.

When the methylol melamine has fully precipitated, it is then readily separated from the reaction medium by filtration, centrifuging or the like. Thereafter, the granular or crystalline product may be dehydrated as by heating at 75° C. in a rotary, tumble, or other suitable dryer or drying means or it may be spray dried so that it may be alkylated. It has been determined that when the methylol melamine has been dehydrated to a water content of 20% or less, it may be substantially fully alkylated according to the present invention, with saturated aliphatic alcohols containing from 1-4 carbon atoms. Since alkylation is an equilibrium reaction, if the amount of water present is in excess of 20%, this water plus the water split off during alkylation will tend to drive the reaction to the left or to the formation of alcohol, preventing full alkylation.

While the methylol melamine may be substantially fully alkylated when having up to 20% water therein, it appears that the less water there is present, the easier it is to alkylate. In this connection, however, if drying to a water content of below 20% is desired, care must be taken not to drive off any of combined formaldehyde, as this would prevent full alkylation of the methylol melamine.

In addition, complete drying of the methylol melamine removes excesses of formaldehyde that tend to maintain the melamine fully methylolated. Thus, in many instances, it is not wholly undesirable that the intermediate methylolated melamine contain some water, as for example amounts of between 5 and 15%.

To completely alkylate fully methylolated melamine, a mole ratio of 1 mole of said methylol melamine (dehydrated to a water content of 20 or less) and between 10 and 16 moles, and preferably between 12 and 15 moles, of a saturated aliphatic alcohol containing 1–4 carbon atoms are reacted at a temperature of between 15° and 60° C. and at a pH of less than 3 until complete solution of the reactants is obtained. At this point, the pH is adjusted to 8–10 with an alkali such as caustic, potassium hydroxide, sodium bicarbonate, or other compatible basic materials and thereafter the solution is vacuum concentrated until a viscous syrup is formed which is substantially free of unreacted alcohol and water.

Sometimes it is advantageous to place a dessicant in with the reaction mixture during alkylation, to tie up water produced by the reaction and/or free water in the methylol compound and alcohol. Suitable dessicants are anhydrous sodium sulfate, magnesium sulfate, sodium silicate and the like.

Below 15° C. the alkylation reaction is prohibitively slow, while above 60° C. some undesirable polymer tends to be formed. Preferably, alkylation is carried out at a temperature of between 15° C. and 40° C.

The pH of the reaction mixture is adjusted to below 3 and preferably to between 1 and 1.5 for optimum results, it having been determined that alkylation proceeds more rapidly and to a higher degree in the presence of a large excess of hydrogen ion. This may be done with a strong mineral or organic acid such as sulfuric, hydrochloric, para-toluene sulfonic acid or any other compatible type of acid-acting materials. Subsequent adjustment of the pH to 8–10 with alkali stabilizes the alkylated methylol melamine in its preferred monomeric form.

The alkylated methylol melamine is vacuum concentrated, after it has been stabilized, to remove unreacted alcohol and water. A vacuum of 23 inches of mercury at pot temperatures up to 50° C. is preferred. Above 50° a vacuum of at least 26 inches of mercury should be used, and an end point temperature of not less than 78° C. nor more than 90° C. at not less than 26 inches of mercury is preferred. Complete removal of water is strongly preferred for best results. In addition to vacuum concentration it is also possible to remove water by an azeotropic distillation using an aromatic hydrocarbon, as for example, benzene, toluene, or xylene.

A simple sopt test to determine when the vacuum concentration is complete is made by removing a sample of the syrup from the container and allowing solids to settle. The larger crystals of sodium sulfate (if caustic and sulfuric acid were used as catalyst) are removed and the syrup is diluted with a large excess, as for example, ten times the sample volume, with xylene. If the cloudiness of the sample increases, insufficient water removal is indicated. Obviously, this method may be employed regardless of what catalysts were employed.

The expression "23 inches of mercury" and similar expressions as they are used herein refer to commercial dial gauge readings. In principal, these readings are obtained as follows. A hollow tube is connected from an opening in the container, the vacuum in which is to be measured, to the upper end of a vertical glass tube, the lower end of which is in a pool of mercury. As a vacuum pump exhausts the air from the container and the glass tube, atmospheric pressure forces mercury up the said tube. The height to which the mercury rises is the measure of the vacuum in the container, which in the present instance is readable in inches.

Obviously, the methylolated melamine prepared according to the present invention may be less than fully alkylated by employing lower mole ratios of alcohol to methylol melamine, while adhering to substantially the same conditions of temperature, pH and the like set forth above. Thus, the mono, di, tri, and the like alkylated methylol melamines may be readily produced. The vacuum concentrated alkylated methylol melamine generally contains inorganic impurities which are chiefly sodium sulfate when the catalyst used in the process for making methylol melamine is sodium hydroxide and when the acid catalyst is sulfuric acid. These impurities are readily removed by filtration. Before filtration, it is generally preferred that a solvent such as n-butanol or certain hydrocarbon solvents such as xylene or mixtures thereof be added to the vacuum concentrate in an amount sufficient to produce a solution containing about 60% solids.

The following examples are given primarily by way of illustration so that the present invention may be more fully understood. No details therein should be construed as limitations on the present invention except as they appear in the appended claims. All parts and percentages are by weight unless otherwise designated.

EXAMPLE 1

Into a suitable reaction vessel, 386 parts (4.76 moles) of formalin (37% formaldehyde solution) was charged and the pH of the reaction mixture was adjusted to between 7.4 and 7.5 with sodium bicarbonate. The formaldehyde solution was then heated to between 55 and 60° C. and 80 parts (0.635 moles) of melamine were charged and mixed with vigorous agitation. The mole ratio of melamine to formaldehyde was 7.5:1. During solution of the melamine, the pH was found to increase to between 8.2 and 8.5, as a result of the reaction taking place. The amount of water was about 52% based on the total weight of the reaction mixture.

When the solids had gone into solution, the speed of the mixing means was greatly reduced, but sufficient to provide a low degree of mixing with little or no agitation or turbulence. The temperature of the reaction mixture was held at between 60 and 65° C. for 1 hour under these conditions of mixing, during which period better than 60% of the solid methylol melamine reaction product was precipitated from the reaction mixture. After the 1-hour period, cooling was initiated such that the cooling rate did not exceed 15° C. per hour. Mixing without agitation was employed during this period.

During the cooling cycle, additional water was added as required by the apparent viscosity of the slurry to adjust the water content from 52% to a content of 65% based on the total weight of the reaction mixture.

After cooling to 30° C. the solids were washed with water on an Oliver rotary vacuum filter, removing approximately 80% of residual formaldehyde from the product. The washed cake was then dried at 50° C. until substantially dry to the feel, the product contained about 5% free moisture.

A yield of better than 90% was realized.

EXAMPLE 2

Seven hundred and fifty-three parts (9.3 moles) of formalin (37% formaldehyde solution) was charged to a suitable reaction vessel equipped with anchor type agitator. 0.7 parts of sodium bicarbonate was added to produce a pH value of 7.4. The formalin-bicarbonate solution was then heated to 50° C. and the melamine charge was begun. One hundred and fifty-six parts (1.24 moles) of melamine was charged as the reaction mixture was mixed with vigorous agitation over a period of 10 minutes, giving a formaldehyde to melamine mole ratio of 7.5:1. The batch became clear, that is, transparent, in approximately 12 minutes after the beginning of the melamine charge. The pH as measured at 25° C. at this point was 8.0.

The batch was then held at a temperature in the range of 51 to 57° C. for 2 hours and 40 minutes. During the first hour and 40 minutes, mixing without agitation was maintained intermittently with an anchor type stirrer. Upon cessation of mixing, the pH was measured at 25° C. as 8.42. The remaining hour was utilized as a hold period with no significant agitation. After the 1-hour hold period, cooling was initiated such that the batch cooled at the rate of 15° per hour. Mixing without agitation was applied intermittently. One hour after cooling had been initiated, the batch temperature was 46° C.

Three hundred and thirty parts of water were added in all with constant agitation. During the water addition, the batch cooled from 46° C. to 42° C. Cooling was continued with mixing without agitation until the batch temperature reached 26° C. an hour later. The batch was filtered and the solids dried and weighed. Three hundred and ninety-eight parts of a substantially dry material (less than 10% free moisture) was recovered from the drier.

A yield of better than 90% was realized.

It will be noted in both Examples 1 and 2 that additional water was added during the cooling cycle. The effect of adding additional water during the cooling stage of the present process is to render the precipitated product easier to handle in conventional solid separating equipment.

EXAMPLE 3

Three hundred and thirty parts of a methylol melamine prepared according to Example 1, 320 parts of methanol, and 10 parts of concentrated sulfuric acid sufficient to adjust the pH to between 1 and 1.5 were charged to a suitable reaction vessel. The mole ratio between the methanol and the methylol melamine was 10:1, respectively. Stirring of the reactants was continued until a slightly hazy solution was obtained. This was achieved in about 1 hour and then the pH of the reaction mixture was adjusted to 8 with alkali. After the adjustment of the reaction mixture to a pH of 8 with alkali, the water and excess alcohol were distilled off in vacuo, keeping the temperature below 50° C. Final traces of water were removed by an azeotropic distillation and the syrupy residue was filtered to yield a clear, water-white product. During methylation, a reaction temperature of about 30° C. was maintained.

The yield of methylated methylol melamine was about 90%.

EXAMPLE 4

The same process as was employed in Example 3 was employed here, except that the mole ratio between methanol and the methylol melamine was 15:1, respectively. The yield was about 90%.

EXAMPLE 5

Into a suitable reaction vessel 153 parts (0.5 moles) of the dried methylol melamine produced according to Example 1 and 370 parts (5 moles) of normal butanol and 3.5 parts of concentrated sulfuric acid in an amount sufficient to reduce the pH of the reaction mixture to 1.2 was added. Thereafter, the procedure was the same as that set forth in Example 3, although a somewhat longer period of time was required for the reactants to go in solution.

The resultant vacuum concentrated water-white syrup was a 90% yield of butylated methylol melamine based on the weight of the melamine.

The methylol melamine produced according to the above examples can be recrystallized from water and melted with decomposition at from 160–168° C.

The alkylated methylol melamines of the present invention are not fully or infinitely water soluble at room temperature and it has been noted that the degree of solubility of a product decreases as the temperature increases. As an example of this, a saturated solution of water and fully methylated methylol melamine, representative of the product made according to the present invention at 25° C. contained about 33% of the methylated product and about 67% of water. A saturated solution of the mixture of these components at 60° C. contained about 16% of the methylated product and about 84% of water.

The alkylated methylol melamines produced according to the present invention when in the liquid form are clear water-white solutions having a Gardner-Holdt viscosity at 25° C. of less than A, a solids content of between 55 and 65%, a xylene tolerance of infinity, a mineral spirits tolerance of greater than 50 pounds of spirits per 100 pounds of resin solution, and an acid number of less than 1 when determined on a solids basis.

The alkylated methylol melamines of this invention are compatible with a wide variety of alkyd resins, and improve their surface coating properties, both when used alone therewith and when used in combination with other commercially available amino resins.

The amino resin of the present invention may be successfully used with the oil-free, or oil-containing alkyds, the latter group being classified as short, medium, and long oil resins.

The oil-containing alkyds, generally speaking, are made from three reactants: (1) a polycarboxylic acid free from nonbenzenoid unsaturation or its anhydride, (2) polyhydric alcohol, and (3) a glyceride oil, either non-drying, semi-drying, drying or the fatty acids derived therefrom or their monoglycerides.

Said polycarboxylic acid is present in preponderant amounts, sometimes to the complete exclusion of any unsaturated polycarboxylic acids, such as those that are not free from any non-benzenoid saturation. The alpha-beta ethylenically unsaturated polycarboxylic acids may be used in relatively small amounts, generally in amounts not exceeding about 10% by weight based on the total weight of polycarboxylic acids used.

Among the polycarboxylic acids free of non-benzenoid unsaturation that may be used are phthalic, oxalic, malonic, succinic, glutaric, sebacic, adipic, pimelic, suberic, azelaic, tricarballylic, citric, tartaric, malic, and the like. Whenever available, the anhydrides may be used. Furthermore, mixtures of these acids and/or their anhydrides may be used.

Among the polyhydric alcohols which may be used are ethylene glycol, diethylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, alkane diols, propylene glycol, dipropylene glycol and the like. These polyhydric alcohols may be used alone or in admixture with each other.

Oils suitable for use in formulating oil-containing alkyds include coconut oil, cottonseed, soybean, linseed, perilla, castor, babassu, murumuru, tallow-beef, mustard seed, rape seed, peanut, sesame, sunflower, walnut, tongue, oiticia, whale, menhaden, sardine, and the like. These oils may be used alone or in admixture with each other.

Good surface coatings for specific purposes may be obtained where the amino resin of the present invention in a 100 part mixture with an alkyd constitutes between 1 and 80 parts thereof, although such mixtures containing between 3 and 40 parts are preferred.

Table 1 below illustrates the compatibility of the amino resin made according to the present invention with various commercial alkyd resins and in varied amounts. Resin A, therein is a resin made according to the process set forth in Example 3 supra, which has been cut in a 50:50 xylene n-butanol mixture. Resin B is a 1:1 mixture of resin A and a commercially available amino resin, hereinafter called resin C which is essentially pentamethylolmelamine which has been alkylated with from 2 to 3 moles of butanol and which is cut in a 45:55 xylene to butanol solvent mixture. Since resin A is cut in a 50:50 xylene butanol mixture, resin B which is a mixture of resins A and C is cut in a 47:53 xylene butanol solvent mixture. Resins A, B, and C each contain, as a catalyst, 1% p-toluene sulfonic acid based on the total amino solids.

It should be understood that while these amino resins are cut in xylene-butanol solvent mixtures, for many purposes all xylene or other hydrocarbon solvents are preferred, as where the odor of butanol is objectionable. In addition, these solvent ratios are illustrative, and may be varied over wide ranges as is well known in the art.

Resin D referred to therein is a short oil alkyd resin which is principally the reaction product of phthalic anhydride, ethylene glycol, pentaerythritol and tall oil fatty acids. Resin E is a medium oil alkyd, the reaction product of phthalic anhydride, soya bean oil, and a monoglyceride; resin F is also a medium oil alkyl, the reaction product of phthalic anhydride, soya fatty acid, and glycerin. Resin G is a medium oil phthalic anhydride, soya fatty acid, glycerin reaction product, which has been coreacted the styrene.

For purposes of determining the compatibility of the amino resin of the present invention it was mixed in graduated amounts with resins D—G and observed, coated on glass surfaces, air dried for 30 minutes, and observed, and then baked on the said surfaces for 10 minutes at 300° F. and observed.

Table 1
COMPATIBILITY WITH ALKYD RESINS

| | Resin A | | | Resin B | | | Resin C | | |
|---|---|---|---|---|---|---|---|---|---|
| | Mix | Air | Bake | M | A | B | M | A | B |
| Resin D+: | | | | | | | | | |
| 10% amino | C | C | C | C | C | C | C | C | C |
| 30% | C | C | C | C | C | C | C | C | BH |
| 50% | C | C | C | C | C | C | C | C | H |
| Resin E+: | | | | | | | | | |
| 10% amino | C | C | C | C | C | C | C | C | C |
| 30% | C | C | C | C | C | C | C | BH | C |
| 50% | C | C | C | C | C | C | C | BH | H |
| Resin F+: | | | | | | | | | |
| 10% amino | C | C | C | C | C | C | C | H | BH |
| 30% | C | C | C | C | C | C | C | Cl | BH |
| 50% | C | C | C | C | BH | C | C | Cl | Cl |
| Resin G+: | | | | | | | | | |
| 10% amino | C | C | C | C | C | C | C | BH | BH |
| 30% | C | C | C | C | C | C | H | BH | Cl |
| 50% | C | C | C | C | C | C | Cl | Cl | Cl |

Code: C=clear; BH=bluish haze; H=hazy; Cl=cloudy.

A study of the table indicates that the resin produced according to the present invention (resin A) is compatible with a wide variety of alkyds, and is superior in compatibility therewith than commercially available amino resin C. In addition, it should be noted that resin B which is a 1:1 mixture of resins A and C is substantially equal to resin A in compatibility. This obviously is the result of resin A being present in the mixture.

Table 2 is an evaluation of films of white baking enamels which have been placed on steel by a 0.003 mil Bird doctor blade and baked 30 minutes at 300° F. The pigment/binder (P/B) ratio of the enamels is 100:100, the pigment being titanium dioxide. The resin ratio of the binder is 80:20 and consists of 80 parts of a short oil alkyd (hereinafter referred to as resin H) which is essentially the reaction product of phthalic anhydride, soya fatty acids and glycerin, and 20 parts of amino resin. Each of the resin binders contains, as a catalyst, 1% p-toluene sulfonic acid based on the weight of the total amino solids. In addition, the total solvent ratio of the enamel has been adjusted to 80:20 xylene/butanol.

Table 2
WHITE ENAMEL EVALUATION

| Resin, 30' at 300° F. | H/A 80/20 | H/A/C 80/10/10 | H/C 80/20 |
|---|---|---|---|
| Steel: | | | |
| Color | 90 | 89 | 85 |
| Gloss Vis. | 90 | 95 | 85 |
| Gloss 60° [1] | 90 | 98 | 84 |
| Sward | 58 | 56 | 46 |
| Mar. Res. | 90 | 80 | 70 |
| Xylene [2] | 100 | 50 | 0 |
| Acetic Acid, [3] 50% | 100 | 50 | 0 |
| NaOH, [4] 10% | 100 | 98 | 10 |

[1] Gardner portable 60° glass meter.
[2] Rating at 20'.
[3] Rating at 1 hour.
[4] Rating at 3 hours.
In the above chart:
A—100 is theoretically perfect for color, gloss vis., gloss 60° and mar res.
B—Swards reading is an actual number. The larger the number, the harder the film.
C—In evaluation of chemical resistance, 100 indicates that the film is substantially unchanged over time period indicated, 0 indicates its complete failure.

Table 2 demonstrates that enamel finishes, the resin binders of which consist of the amino resin of the present invention, and a commercially available alkyd, are superior. It further demonstrates that when the resin binder consists of the aminoplast material of the present invention, said commercially available amino resin and the said alkyd, the finish is superior to one in which the binder is a mixture of said commercial amino and said alkyd. This improvement is obviously the result of the presence of the amino resin of the invention in the binder.

Conventional acid catalysts may be used with the resin of the present invention and in conventional amounts. A suitable catalyst is p-toluene sulfonic acid which has been used with success in conventional amounts such as between 0.25–1.50% of the total amino resin although smaller and larger amounts have been found to be satisfactory. Other suitable catalysts include oxalic, formic, phthalic, maleic, chlorofumaric, trichloroacetic, phosphoric, hydrochloric acid and the like.

In addition to being useful in surface coatings, the alkylated methylol melamines of the present invention are useful as cross-linking agents in molding, bonding, laminates and as a textile resin.

We claim:

1. A process comprising heating with continuous mixing reactants comprising melamine and formaldehyde in mole ratios of from 1:6.5 to 1:20, respectively, in the presence of between 45 and 75% by weight of water based on the total weight of the reaction mixture, maintaining a pH between 7.0 and 8.5 and a temperature between 45° C. and 75° C. until the reaction mixture has cleared, maintaining the temperature between 45° C. and 75° C. while stirring the reaction mixture, while the reaction continues, with movement through the reaction medium in an otherwise unagitated dispersion, until a major portion of a precipitated product is formed, and thereafter cooling the resultant mixture to a temperature of between 15 and 30° C. until substantially all of the product has precipitated and drying the resultant product to a free water content of less than 20%.

2. A process comprising heating with continuous mixing reactants comprising melamine and formaldehyde in mole ratios of from 1:6.5 to 1:20, respectively, in the presence of between 55 and 65% by weight of water based on the total weight of the reaction mixture, maintaining a pH of between 7.0 and about 8.5 and a temperature between 55° C. and 65° C. until the reaction mixture has cleared, maintaining the temperature between 55° C. and 65° C. while stirring the reaction mixture, while the reaction continues, with movement through the reaction medium in an otherwise unagitated dispersion until a major portion of a precipitated product is formed, and thereafter cooling the resultant mixture to a temperature of between 15 and 30° C. until substantially all of the product has precipitated and drying the resultant product to a free water content of less than 20%.

3. A process comprising heating with continuous mixing and agitation reactants comprising melamine and formaldehyde in mole ratios of from 1:6.5 to 1:10, respectively, in the presence of between 55 and 65% by weight of water based on the total weight of the reaction mixture, maintaining a pH of between 7 and 8.5 and a temperature between 55 and 65° C. until the reaction mixture has cleared, maintaining the temperature between 55 and 65° C. while stirring the reaction mixture, while the reaction continues, with movement through the reaction medium in an otherwise unagitated dispersion until a major portion of a precipitated product is formed, and thereafter cooling the resultant mixture to a temperature of between 15 and 30° C. until substantially all of the product has precipitated drying the resultant product to a free water content of less than 20%.

4. A process comprising heating with continuous mixing reactants comprising melamine and formaldehyde in mole ratios of from 1:6.5 to 1:20, respectively, in the presence of from between 45 and 75% by weight of water based on the total weight of the reaction mixture, maintaining a pH of between 7.0 and 8.5 and a temperature between 45 and 75° C. until the reaction mixture has cleared, maintaining the temperature between 45 and 75° C. while stirring the reaction mixture, while the reaction continues, with movement through the reaction medium in an otherwise unagitated dispersion until a major portion of a precipitated product is formed, cooling the resultant mixture to a temperature of between 15 and 30° C. until substantially all of the product has precipitated, separating the solid precipitated reaction product from the reaction medium, drying said product to a water content of less than about 20% based on the weight of the reaction product, reacting said product with a saturated aliphatic monohydric alcohol containing 1 to 4 carbon atoms, while maintaining a temperature of between 15 and 60° C. and a pH of less than 3, until complete solution is obtained, adjusting the pH of the mixture to about 8 to 10, and thereafter vacuum concentrating the resultant product until it is substantially free of unreacted alcohol and water.

5. A process comprising heating with continuous mixing reactants comprising melamine and formaldehyde in mole ratios of from 1:6.5 to 1:20, respectively, in the presence of from between 45 and 75% by weight of water based on the total weight of the reaction mixture, maintaining a pH of between 7.0 and 8.5 and a temperature between 45 and 75° C. until the reaction mixture has cleared, maintaining the temperature between 45 and 75° C. while stirring the reaction mixture, while the reaction continues, with movement through the reaction medium in an otherwise unagitated dispersion until a major portion of a precipitated product is formed, cooling the resultant reaction mixture to a temperature of between 15 and 30° C., separating said precipitated solid reaction product from the reaction medium, drying said product to a water content of between about 5 and 15% based on the weight of the reaction product, reacting one mole of said product in the presence of from between 10 and about 16 moles of a saturated aliphatic monohydric alcohol containing from 1 to 4 carbon atoms, maintaining the reaction product at a temperature of between 15 and 40° C. and at a pH of between 1 and 1.5 until complete solution is obtained, adjusting the pH of the reaction mixture to from 8 to 10, and thereafter vacuum concentrating the resulting product until it is substantially free of unreacted alcohol and water.

6. A process comprising heating with continuous mixing reactants comprising melamine and formaldehyde in mole ratios of from 1:6.5 to 1:20, respectively, in the presence of between 45 and 75% by weight of water based on the total weight of the reaction mixture, maintaining a pH of between 7.0 and 8.5 and a temperature between 45 and 75° C. until the reaction mixture has cleared, maintaining the temperature between 45 and 75° C. while stirring the reaction mixture, while the reaction continues, with movement through the reaction medium in an otherwise unagitated dispersion until a major portion of a precipitated product is formed, thereafter cooling the resulting mixture to a temperature of between 15 and 30° C. until substantially all of the product has precipitated, separating said solid reaction product from the reaction medium, drying said product to a water content of between 5 and 15% based on the weight of the reaction product, reacting one mole of said product in the presence of from between 12 and 15 moles of a saturated aliphatic monohydric alcohol containing from 1 to 4 carbon atoms, maintaining the reaction mixture at a temperature of between 15 and 40° C. and at a pH of between 1 and 1.5 until complete solution is obtained, adjusting the pH of the mixture to from 8 to 10 and thereafter vacuum concentrating until the resulting product is substantially free of unreacted alcohol and water.

7. A process comprising heating with continuous mixing reactants comprising melamine and formaldehyde in mole ratios of from 1:6.5 to 1:10, respectively, in the presence of between 55 and 65% by weight of water based on the total weight of the reaction mixture, maintaining a pH of between 7.0 to 8.5 and a temperature between 55 and 65° C. until the reaction mixture has cleared, maintaining the temperature between 55 and 65° C. while stirring the reaction mixture, while the reaction continues, with movement through the reaction medium in an otherwise unagitated dispersion until a major portion of a precipitated product is formed, thereafter cooling the resultant mixture to a temperature of between 15 and 30° C. until substantially all of the product has precipitated, separating said solid precipitated reaction product from the reaction medium, drying said product to a water content of less than about 20% based on the weight of the reaction product, reacting one mole of said product in the presence of from between 10 and about 16 moles of a saturated aliphatic monohydric alcohol containing from 1 to 4 carbon atoms, maintaining the reaction mixture at a temperature of between 15 and 60° C. and at a pH of less than 3 until complete solution is obtained, adjusting the pH of the mixture to from 8 to 10 and thereafter vacuum concentrating until the resulting product is substantially free of unreacted alcohol and water.

8. The process according to claim 4 characterized by the alcohol being methanol.

9. The process according to claim 4 characterized by the alcohol being ethanol.

10. The process according to claim 4 characterized by the alcohol being propyl alcohol.

11. The process according to claim 4 characterized by the alcohol being butyl alcohol.

References Cited in the file of this patent

UNITED STATES PATENTS

| | | |
|---|---|---|
| 2,197,357 | Widmer et al. | Apr. 16, 1940 |
| 2,486,665 | Marling | Nov. 1, 1949 |
| 2,529,856 | West | Nov. 14, 1950 |
| 2,684,347 | Nickerson | July 20, 1954 |

OTHER REFERENCES

Webster's New International Dictionary, 2nd Ed., Merriam Co., Springfield, Mass. (1956), p. 50, "Agitate."

Weissberger: Technique of Organic Chemistry, vol. III, part 1, "Separation & Purification," pp. 419–21, 431–3 and 521–6, Interscience, (1956).

UNITED STATES PATENT OFFICE
CERTIFICATE OF CORRECTION

Patent No. 2,998,410

August 29, 1961

Albert W. Jefts et al.

It is hereby certified that error appears in the above numbered patent requiring correction and that the said Letters Patent should read as corrected below.

Column 3, line 8, for "if" read -- in --; column 5, line 42, for "sopt" read -- spot --; column 7, line 49, for "Example 3" read -- Example 4 --; column 8, line 35, for "adonited" read -- adonitol --; column 9, line 7, for "the" read -- with --; column 12, line 18, for "to" read -- and --.

Signed and sealed this 30th day of January 1962.

(SEAL)
Attest:

ERNEST W. SWIDER
Attesting Officer

DAVID L. LADD
Commissioner of Patents